United States Patent
Soerensen

(10) Patent No.: US 8,250,846 B2
(45) Date of Patent: Aug. 28, 2012

(54) PUSH-PULL CHAIN AND ACTUATOR

(75) Inventor: Jens Joerren Soerensen, Copenhagen S (DK)

(73) Assignee: VKR Holding A/S, Soborg (DK)

( * ) Notice: Subject to any disclaimer, the term of this patent is extended or adjusted under 35 U.S.C. 154(b) by 991 days.

(21) Appl. No.: 11/596,163

(22) PCT Filed: Apr. 26, 2005

(86) PCT No.: PCT/EP2005/004449
§ 371 (c)(1),
(2), (4) Date: Oct. 8, 2008

(87) PCT Pub. No.: WO2005/108821
PCT Pub. Date: Nov. 17, 2005

(65) Prior Publication Data
US 2009/0124444 A1    May 14, 2009

(30) Foreign Application Priority Data

May 12, 2004  (DK) .............................. 2004 000758
Oct. 29, 2004  (DK) .................................. 2004 01663

(51) Int. Cl.
*F16G 13/20* (2006.01)
(52) U.S. Cl. ....... 59/78; 59/5; 59/93; 474/206; 474/212; 198/784; 89/47

(58) Field of Classification Search .................... 59/4, 5, 59/78, 78.1, 93; 474/206, 212; 198/784; 89/47
See application file for complete search history.

(56) References Cited

U.S. PATENT DOCUMENTS

| | | | | |
|---|---|---|---|---|
| 889,321 | A * | 6/1908 | Meigs et al. | 89/47 |
| 3,742,775 | A * | 7/1973 | Hayes et al. | 474/140 |
| 4,719,840 | A * | 1/1988 | Goodell et al. | 89/47 |
| 5,267,909 | A * | 12/1993 | Iacchetta | 474/206 |
| 5,277,097 | A * | 1/1994 | Pehker | 89/47 |
| 5,690,571 | A * | 11/1997 | Mott | 474/212 |
| 5,895,880 | A * | 4/1999 | Golden | 89/47 |
| 6,223,515 | B1 * | 5/2001 | Koschig et al. | 59/4 |
| 6,244,426 | B1 * | 6/2001 | Murano et al. | 198/784 |

FOREIGN PATENT DOCUMENTS

| | | |
|---|---|---|
| DE | 10206274 A1 | 8/2003 |
| EP | 1165921 B1 | 1/2003 |

* cited by examiner

*Primary Examiner* — David B Jones
(74) *Attorney, Agent, or Firm* — K. David Crockett, Esq.; Paul J. Backofen, Esq.; Crockett & Crockett, PC

(57) ABSTRACT

A push-pull chain that can bend in one direction only, and is provided with at least two rollers on each of the driving pins, one of the rollers engages a drive sprocket and the other of said at least two rollers engages a chain guide surface. An actuator for e.g. opening and closing a window that uses this dual-roller push-pull chain. A link driven push-pull chain that can bend in one direction only, with links that is shaped as an engagement surface for engaging a drive sprocket. An actuator for e.g. opening and closing a window that uses the link driven push-pull chain.

35 Claims, 14 Drawing Sheets

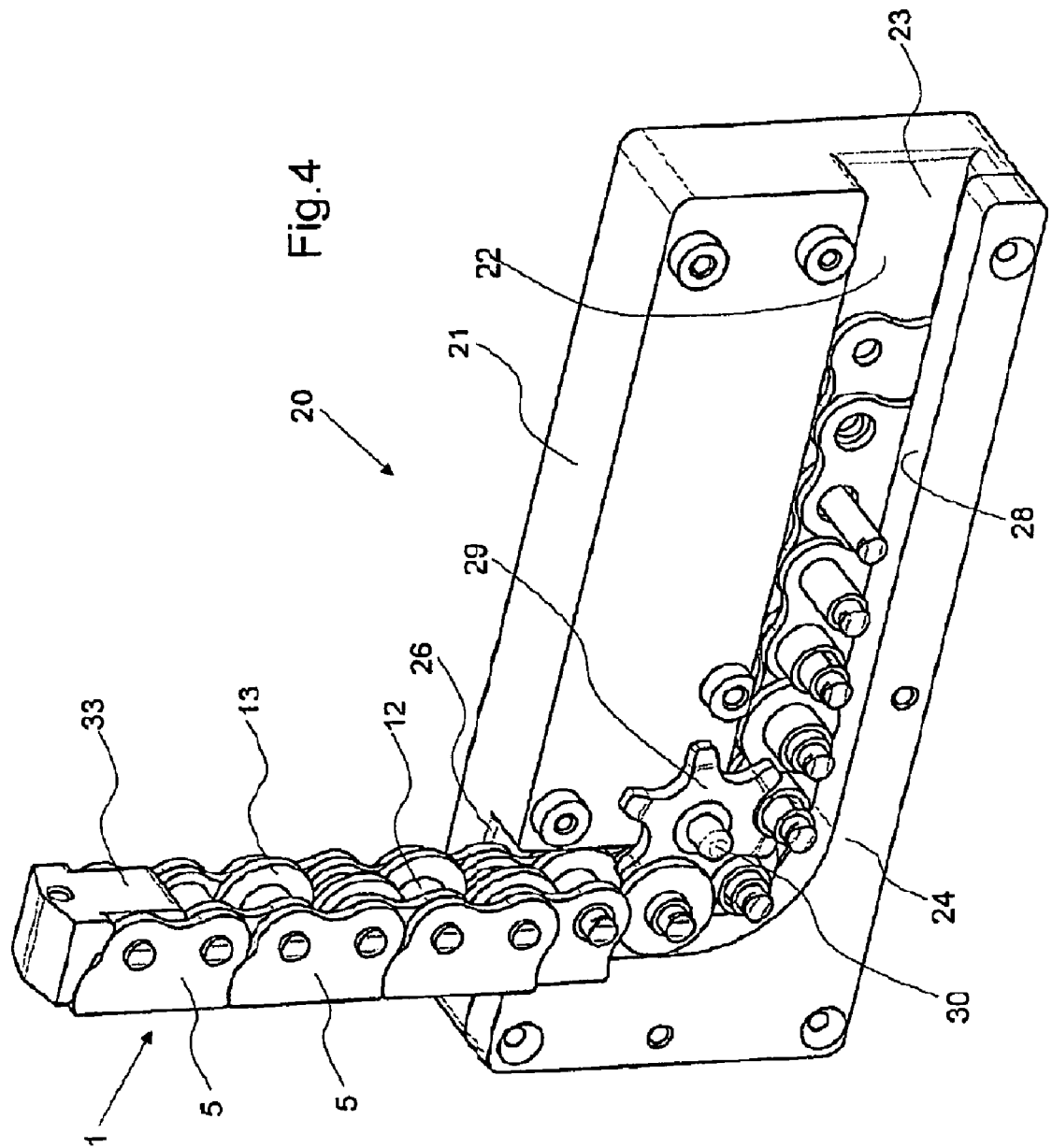

PUSH-PULL CHAIN AND ACTUATOR

The present invention relates to push-pull chains for use in actuators, in particular to push-pull chains that can bend in one direction only. The invention also relates to an actuator that comprises such a push-pull chain.

BACKGROUND ART

DE 102 06 274 discloses a push-pull chain formed by a plurality of pairs of inner links and outer links, with alternate pairs of the inner links being sequentially coupled to alternate pairs of outer links by parallel driving pins with rollers. The ends of the links are provided with faces which abut in a manner to prevent the chain from bending by rotation of the links about their hinges in one direction but allow the chain to bend freely in the other direction. The faces have a complementary shape to each other so that, when the chain is under pressure, they lie directly against each other to prevent a bending movement. The chain can be used in an actuator with a chain path leading to a chain exit and guiding the chain past a sprocket that engages the rollers to drive the chain. The rollers roll on the guide surfaces of the chain path. The chain path comprises an arc-shaped section concentric with the sprocket to guide the chain along the drive sprocket with the rollers engaging the guide surface. The engagement between the rollers and the sprocket prevents the rollers from rotating, and thus the rollers are not able roll when moving through the arc-shaped section of the chain path. When the chain is under load, the rollers are pressed with a high force towards the guide surface of the chain path in the arc-shaped section, i.e. there where the rollers are engaging the teeth of the sprocket and cannot rotate. The rollers are thus dragged over the arc-shaped section under high load, and the resulting frictional losses reduce the mechanical efficiency of the actuator.

Document U.S. Pat. No. 3,976,166 discloses an elevating device including a push-pull chain provided with central rollers for engaging a sprocket and a curved guide surface that urges the chain around the sprocket. The simultaneous engagement of the sprocket and the guide surface cause the above described problem of dragging the rollers over the guide surface at the location where the rollers are highly loaded, thus causing friction losses.

Document U.S. Pat. No. 5,895,880 discloses a projectile ramming apparatus including a push pull chain provided with lateral rollers guided for engaging two sprockets and a curved channel that urges the chain around the sprockets. The simultaneous engagement of the sprocket and the guide surface result in the above described problem of frictional losses caused by dragging locked rollers.

Document EP 0829659 discloses a hybrid power transmission chain comprising a structure from both roller and silent chain. The inner chain include bushings that ride along the teeth of a sprocket and the outer chain comprises link plate with inverted teeth that engage two other—differently sized and shaped sprockets. This type of chain is not suitable for use in an actuator but it combines the advantages of the wear resistance of a roller chain with the silence of a silent chain. However, due to the low speed at which actuator chains are operated neither of these advantages is relevant in the field of the present invention.

DISCLOSURE OF THE INVENTION

On this background, it is an object of the present invention to provide a push-pull chain of the kind referred to initially, that can be used to obtain a higher mechanical efficiency in push-pull chain actuators. A push-pull chain for use in an actuator is provided with a sprocket to drive said chain, said chain comprising a plurality pairs of inner links and outer links, alternate pairs of said inner links being sequentially coupled to alternate pairs of said outer links by parallel driving pins with rollers, the links being shaped to allow the chain to bend in one direction only, and at least two rollers being placed on each of the driving pins, one of said at least two rollers on a given driving pin engages only said sprocket at the same time that the other of said at least two rollers engages only a guide surface of said actuator.

Each driving pin is thus provided with at least two rollers that can rotate independently of one another.

Both of the at least two rollers may have equal outer diameter. Alternatively, the driving pins can be provided with a roller with a large diameter and a roller with a small diameter. The large diameter rollers serve to engage a guide surface, and the small diameter rollers serve to engage a sprocket. Thus, the large diameter roller can roll freely on the guide surface whilst the small diameter rollers are locked because of their engagement with the sprocket, and the chain can move past the sprocket without any blocked rollers being dragged over a guide surface.

The maximum thrust load of the actuator is often limited by the maximum force that the drive unit of the actuator can deliver to the chain. By increasing the mechanical efficiency of the actuator, higher thrust loads can be handled with the same drive unit.

The large diameter rollers and the small diameter rollers are preferably staggered from driving pin to driving pin. This allows for an increased diameter of the large rollers, thus further increasing the mechanical efficiency.

The small diameter rollers can be higher than the large diameter rollers, preferably about two four times as high, so there is space for the sprocket between the staggered large diameter rollers.

The inner links and/or outer links may have a complementary shape to each other so that, when the chain is under pressure, their longitudinal ends lie directly against each other, to prevent a bending movement of the chain in one direction.

Preferably, the holes for the driving pins are offset to one side in the height of the links and projections on one longitudinal end of the side away from the pins are complementary with the opposite end of the adjacent link.

The large diameter rollers may protrude on one side over the height of the links.

It is another object of the invention to provide a push-pull chain actuator with an improved mechanical efficiency. An actuator with a chain comprises a sprocket, and an actuator housing provided with a chain path in communication with a chain exit opening, the chain path including a guide surface, the chain being at least partially received in the chain path, the sprocket engages only one of the at least two rollers on a given drive pin at the same time that the guide surface engages only the other of the at least two rollers on the given drive pin.

In this actuator the rollers that engage the guide surface are always free to roll when the other rollers are engaged by the sprocket. The mechanical efficiency is improved by the absence of rollers that are dragged over the guide surface.

The guide surfaces are formed by two oppositely arranged and preferably grooved rails.

The chain path may comprise an arc-shaped section guiding the chain along the drive sprocket with the small diameter rollers engaging the sprocket and the large diameter rollers engaging a curved guide surface.

The guide surface in said arc-shaped section may have a width that is less or equal to the width of the other one of said at least two rollers that engages the guide surface in the arc-shaped section.

The arc-shaped section of the chain path can be provided with a recessed section besides the guide surface, said recessed section providing space to accommodate the teeth of the sprocket.

The guide surface may have a width that is equal or slightly less than the width of the two of said at least two rollers together It is a further object of the invention to provide a push-pull chain of the kind referred to initially, that can be used to obtain a higher mechanical efficiency in push-pull chain actuators. A push-pull chain comprises a plurality pairs of inner links and outer links, alternate pairs of said inner links being sequentially coupled to alternate pairs of outer links by parallel driving pins provided with rollers for engaging a guide surface that guides the chain around the sprocket, the links being shaped to allow the chain to bend to one side only, and the link contour on said one side is shaped to form an engagement surface for engaging a sprocket.

By using the links to engage the sprocket, the rollers are free to rotate at all times and roll smoothly over the guide surface of the actuator concerned, also there where the sprocket engages the chain. The chain can move past the sprocket without any blocked rollers being dragged over a guide surface, thus improving the mechanical efficiency of the actuator in which the chain is used.

The engagement surface may form a recess between the holes in the links that receives the drive pins or bushes. The engagement surface may form convex protrusions around each of the holes that receive the drive pins or bushes. The recess between the holes is suitable for receiving a tooth of a drive sprocket and the protrusions are suitable for being received in the recesses between the teeth of a drive sprocket.

The roller preferably has a large diameter section and a small diameter section. The large diameter section and the small diameter section are preferably staggered from drive pin to drive pin, so as to allow an overlap in radial direction of the large diameter sections of adjacent rollers. This allows the use of even larger diameters for the large diameter sections, thereby further increasing the mechanical efficiency.

The large diameter section and the small diameter section may be formed by separate rollers, this allows for the roller to be produced from preferably die-stamped rings.

The longitudinal ends of the inner links and/or outer links can have a complementary shape to each other so that, when the chain is under pressure, their longitudinal ends lie directly against each other, to prevent a bending movement of the chain in one direction.

The holes for the pins may be offset to one side in the height of the links, and projections on one longitudinal end of the side away from the pins are complementary with the opposite end of the adjacent link.

The contour of the projection may form part of a recess in the engagement surface between two adjacent links that is suitable for receiving a tooth of a drive sprocket.

It is yet another object of the invention to provide a push-pull chain actuator with an improved mechanical efficiency. An actuator with a chain as described below, includes an actuator housing provided with a chain path in communication with a chain exit opening, the chain in its retracted position being at least partially received in the chain path, with a drive sprocket engaging the engagement surface of one or more of the links.

In this actuator the chain may have single large diameter roller that are always free to roll over the guide surface of the chain path, because they are never engaged by the sprocket. The mechanical efficiency is improved by the absence of rollers that are dragged over the side surface because they are blocked by the engagement of a sprocket.

The guide surface can be formed by a preferably grooved rail.

Preferably, the chain path comprises an arc-shaped section guiding the chain along the drive sprocket with the links engaging the sprocket.

Further objects, features, advantages. and properties of the push-pull chains and actuators according to the invention will become apparent from the detailed description.

BRIEF DESCRIPTION OF THE DRAWINGS

In the following detailed portion of the present description, the invention will be explained in more detail with reference to the exemplary embodiments shown in the drawings, in which.

DETAILED DESCRIPTION

Figure 1A:
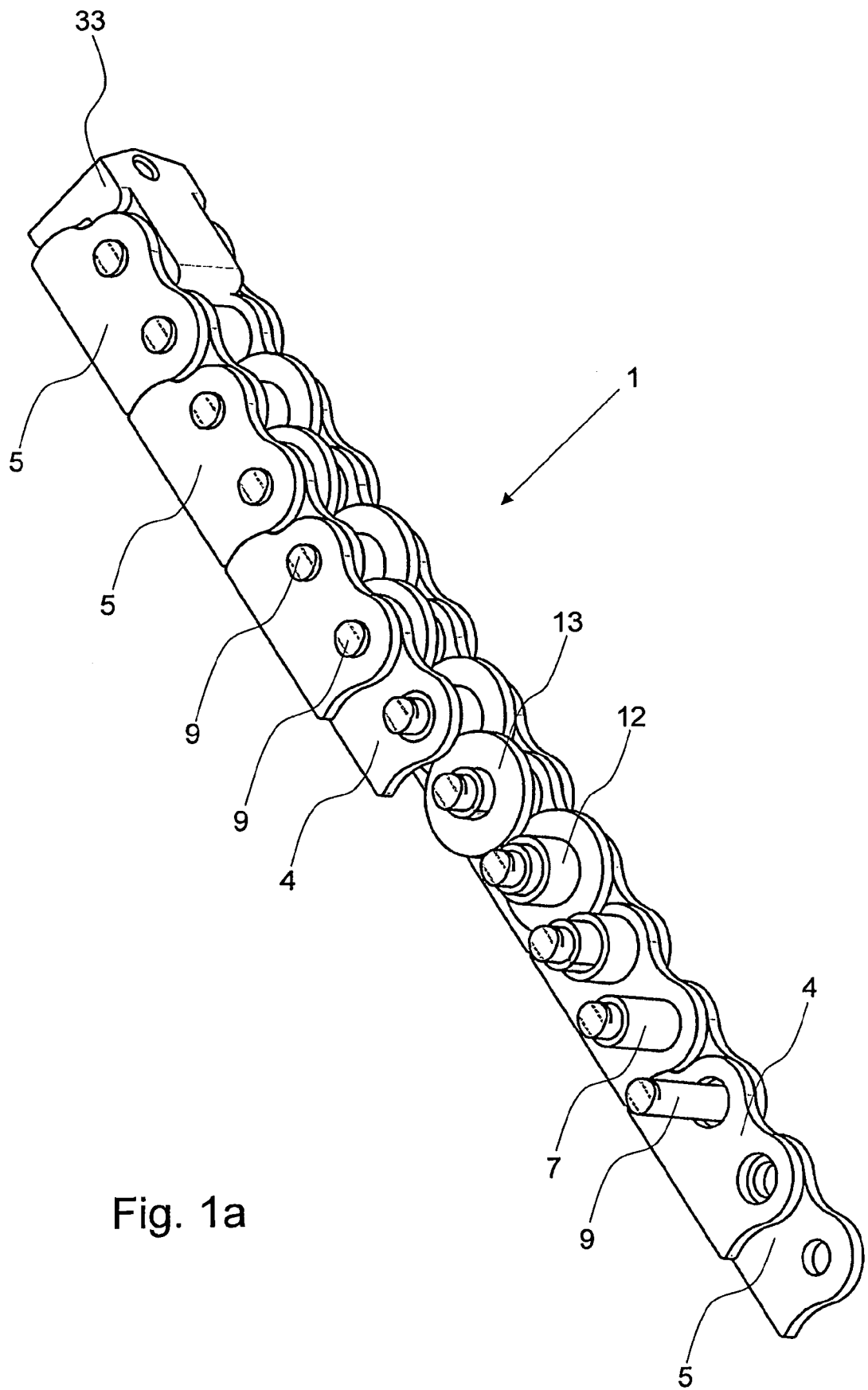
FIG. 1a is a perspective cut-away view on a push-pull chain according to an embodiment of the invention when it is straight.
Figure 1B:
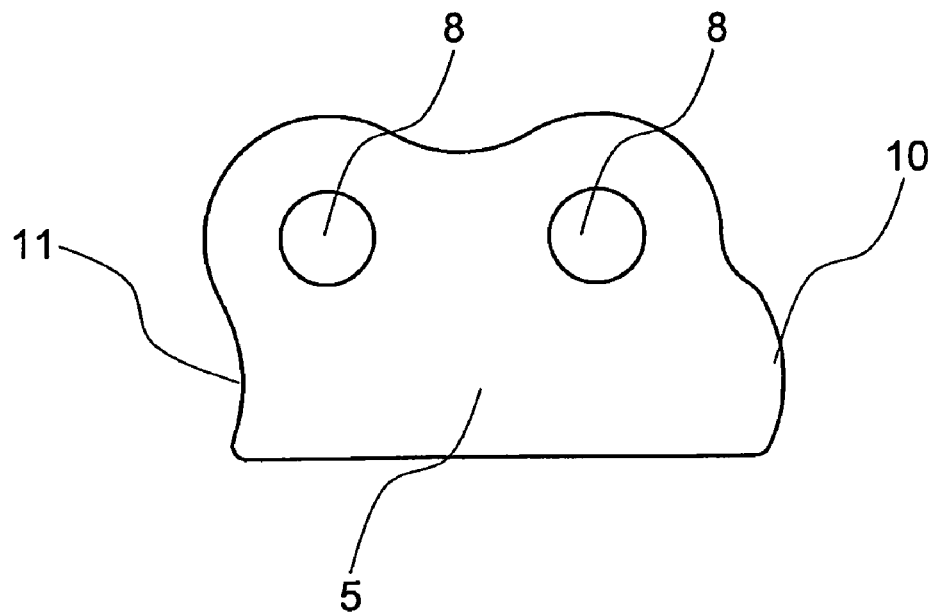
FIG. 1b is a detailed side view of an outer link.
Figure 1C:
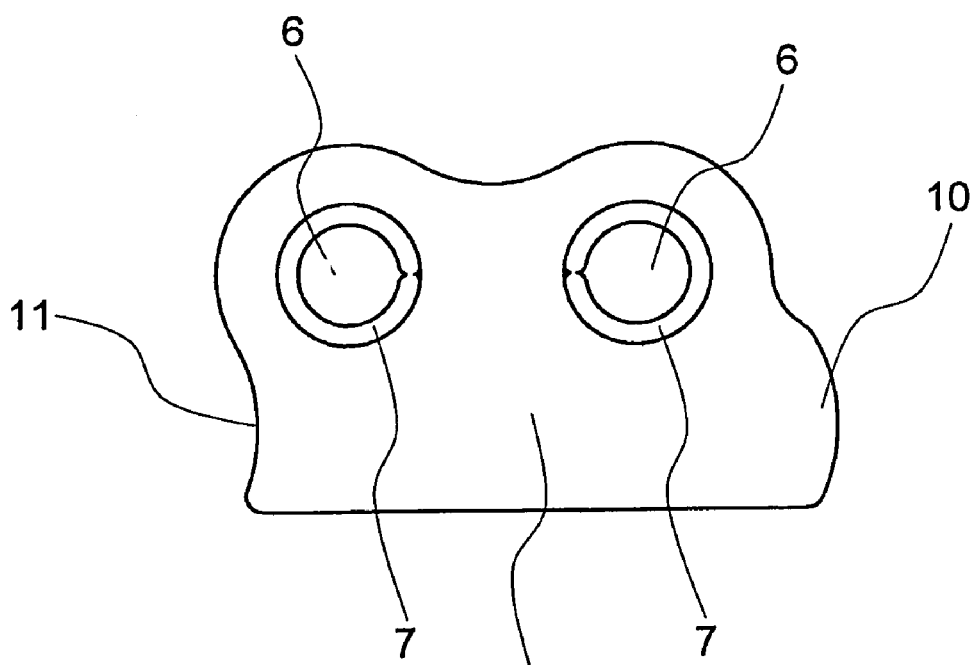
FIG. 1c is a detailed side view of an inner link.
Figure 1D:
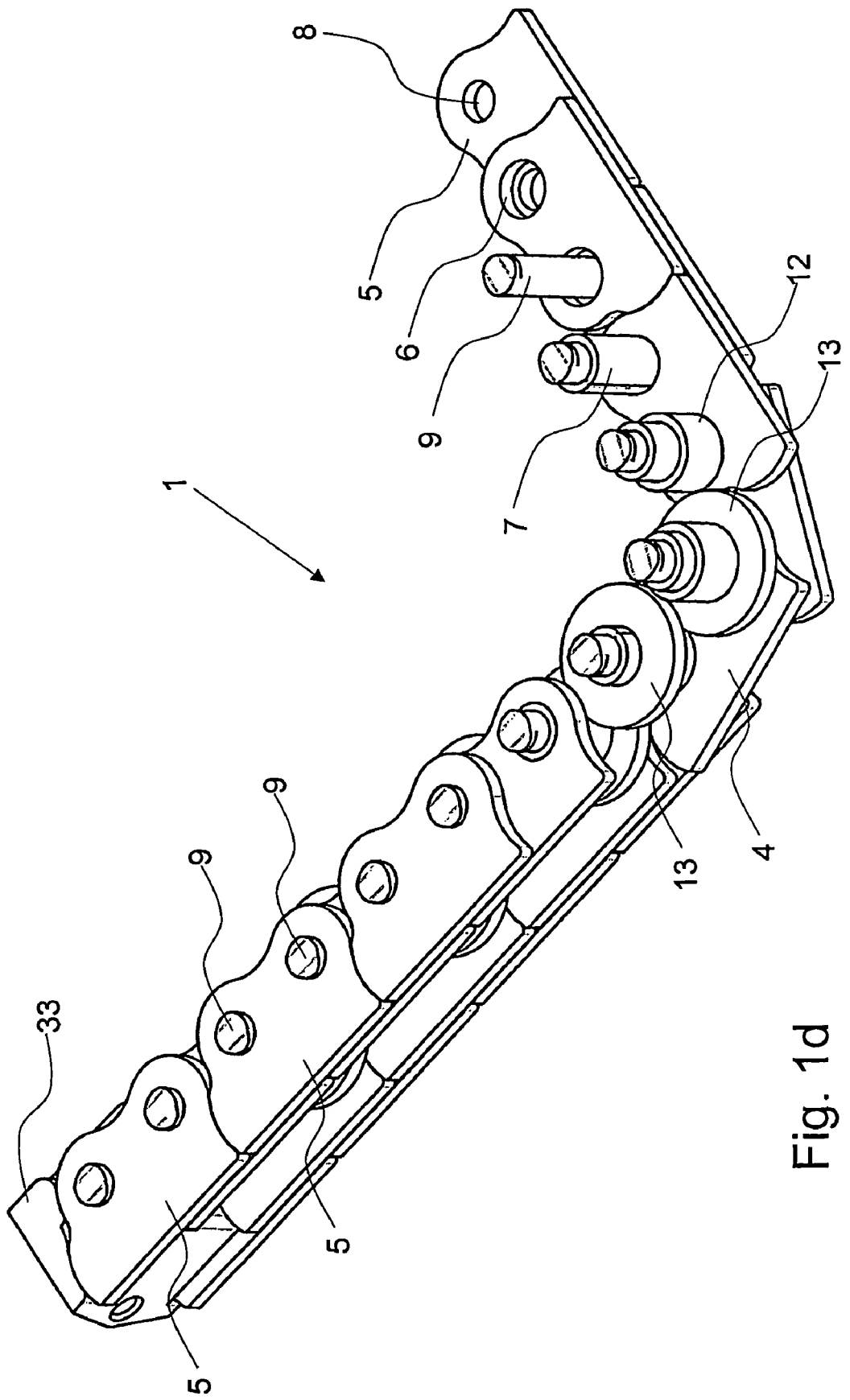
FIG. 1d is a perspective cut-away view on the chain of FIG. 1a when it is bended.

FIGS. 1a to 1d, 2 and 3 illustrate a chain according to a first preferred embodiment of the invention. The chain 1 is composed of pairs of inner links 4 and outer links 5. The inner and outer links are formed by metal plates that are preferably manufactured in a die stamping process.

The inner links 4 are provided with pairs of holes 6 that receive bushings 7 connecting the pairs of inner links. The outer links 5 are provided with pairs of holes 8 that receive driving pins 9 connecting the pairs of outer links. The driving pins 9 are rotably received inside the bushings 7 and thus hinge the pairs of inner links 5 to the pairs of outer links 5.

The holes 6,8 are offset to one side in the height of the links 4, 5 and projections 10 on one longitudinal end of the side away from the pins are complementary with the recesses 11 on the opposite end of the adjacent link. When the chain 1 is straight as shown in FIG. 1 the projections 10 abut with the recesses 11. The links thus have a complementary shape to each other so that, when the chain is under pressure, their longitudinal ends lie directly against each other, to prevent the chain from bending in one direction, which in FIG. 1 would be concave upward.

Figure 2:
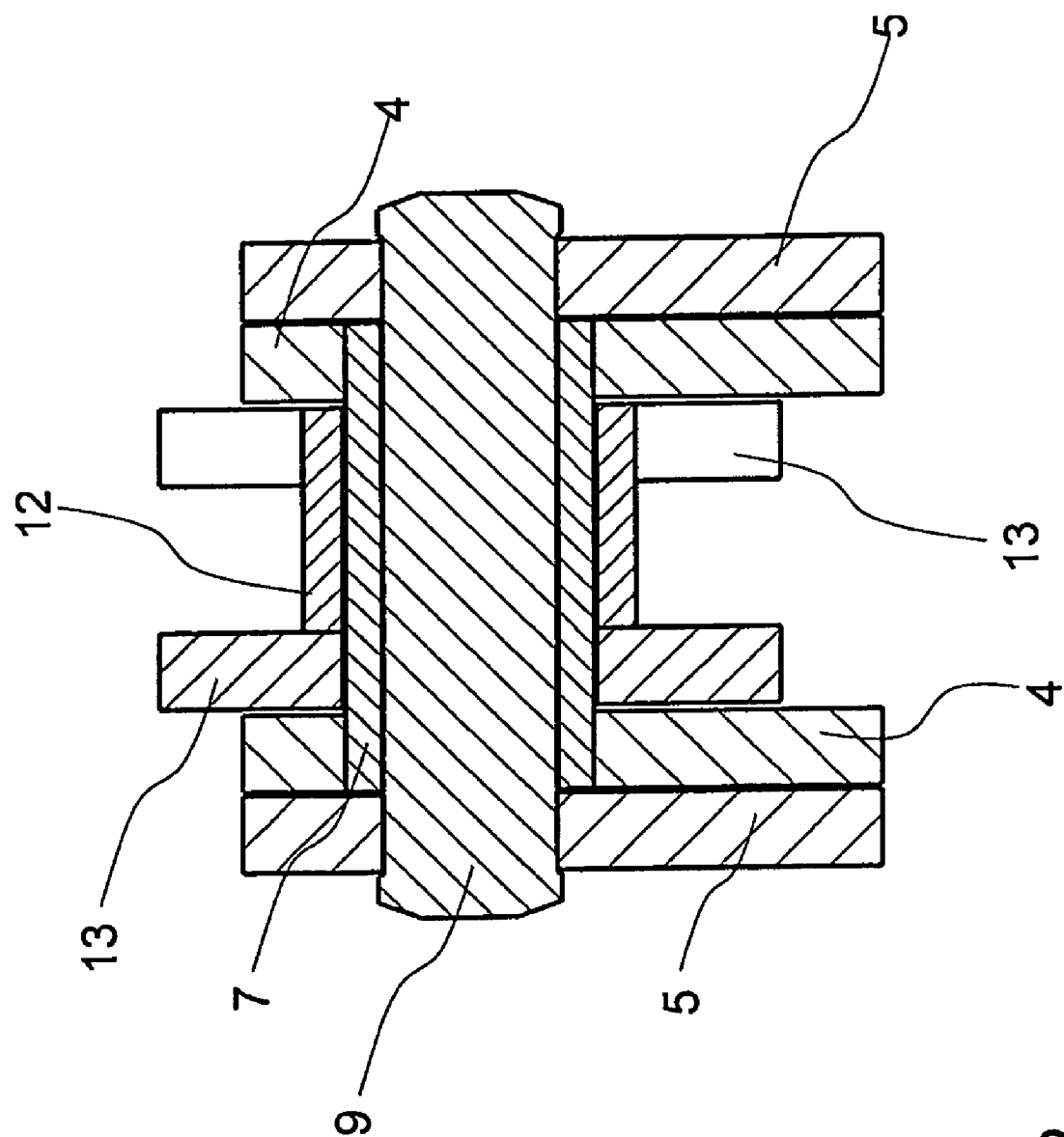
FIG. 2, is a cross-sectional view through the chain of FIG. 1a, FIG. 3 is a top view of the chain of FIG. 1a, FIG. 4 is a perspective cut-away view of an actuator with a chain of FIG. 1a, FIG. 5a is a perspective cut-away view on a push-pull chain according to a second embodiment of the invention.
Figure 3:
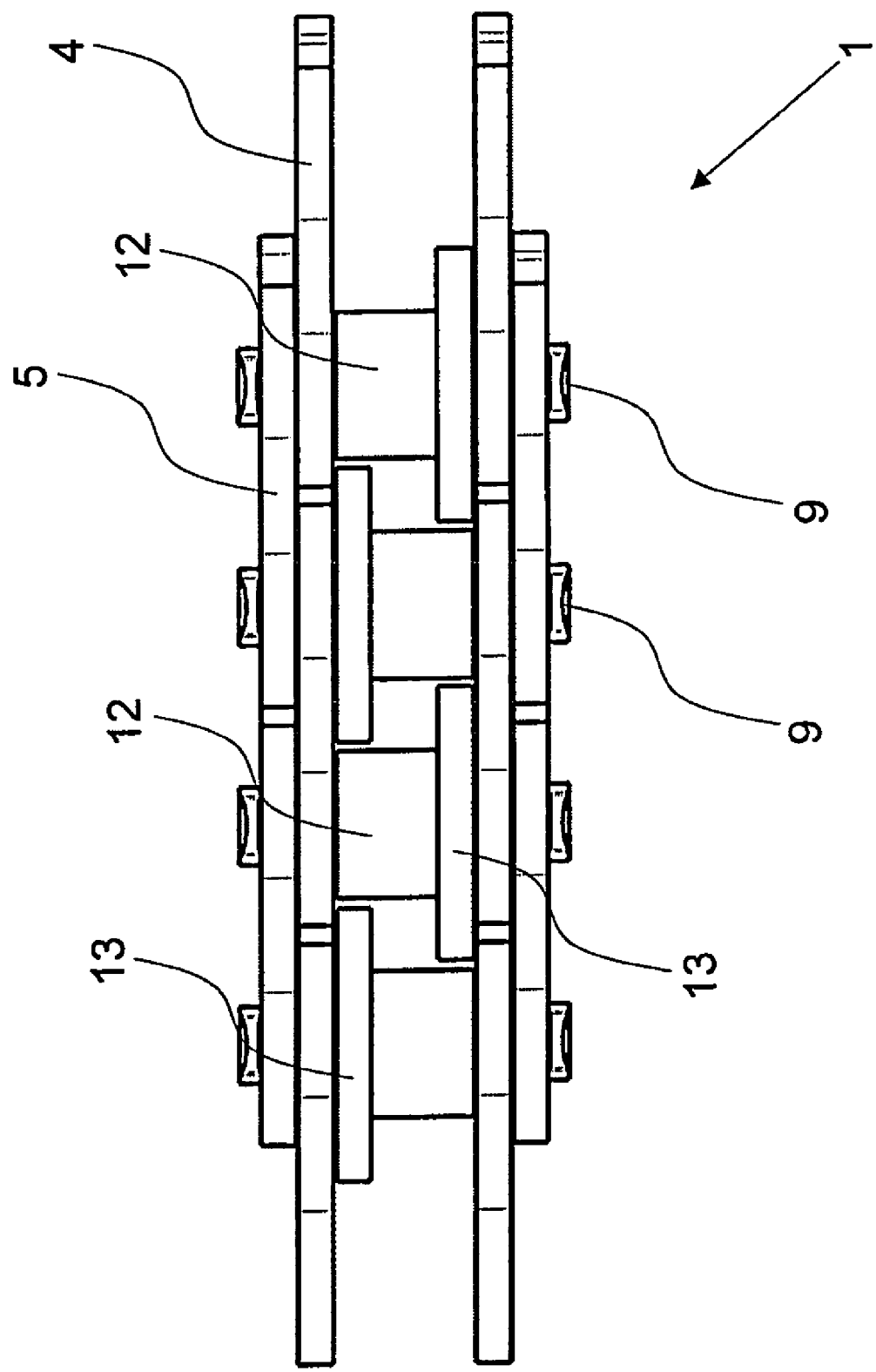
Figure 5A:
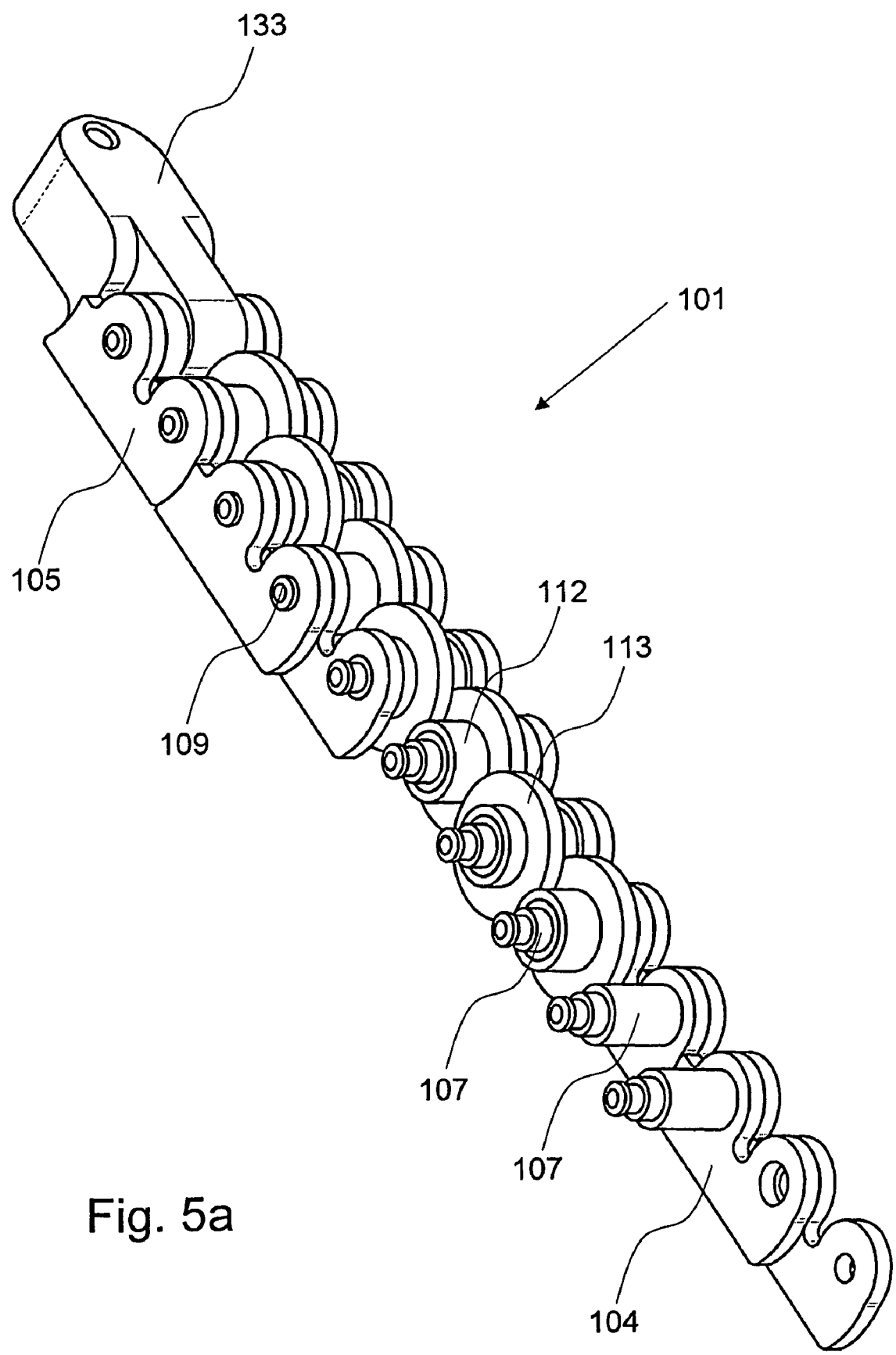
FIG. 5b is a detailed side view of an outer link of the second embodiment.
FIG. 5c is a detailed side view of an inner link of the second embodiment.
FIG. 5d is a perspective cut-away view on the chain of FIG. 5a when it is bended.
Figure 5B:
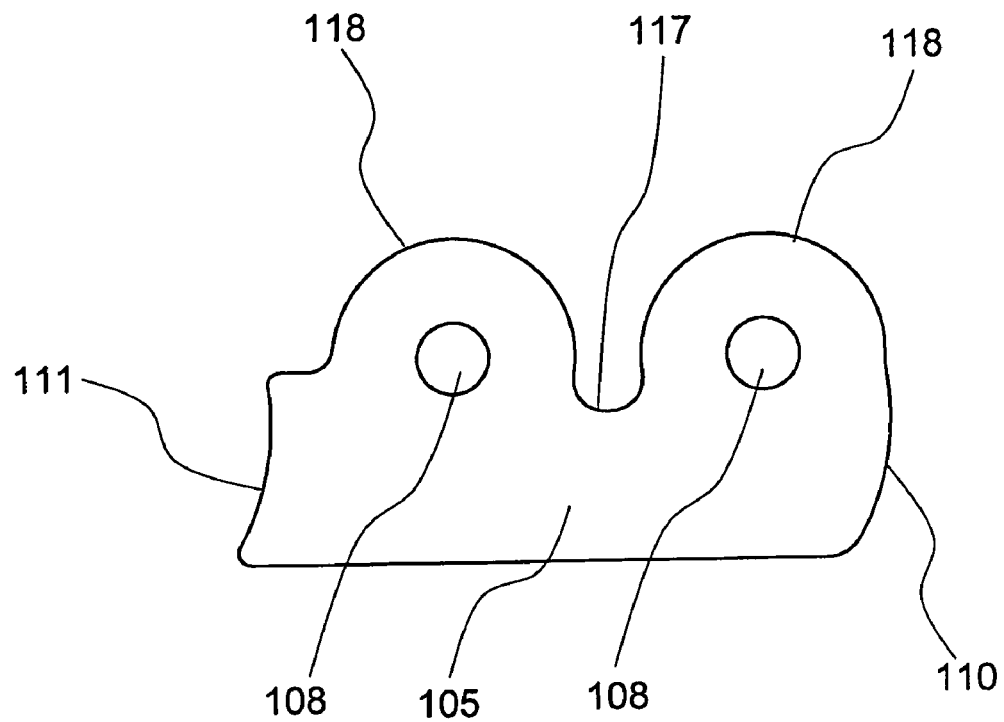
Figure 5C:
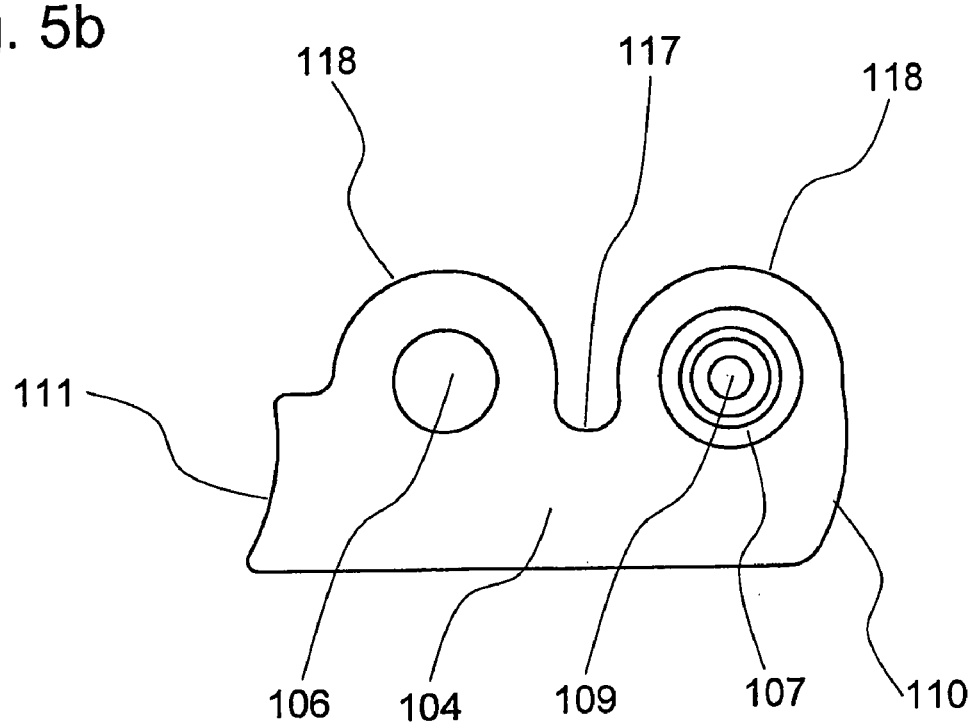
Figure 5D:
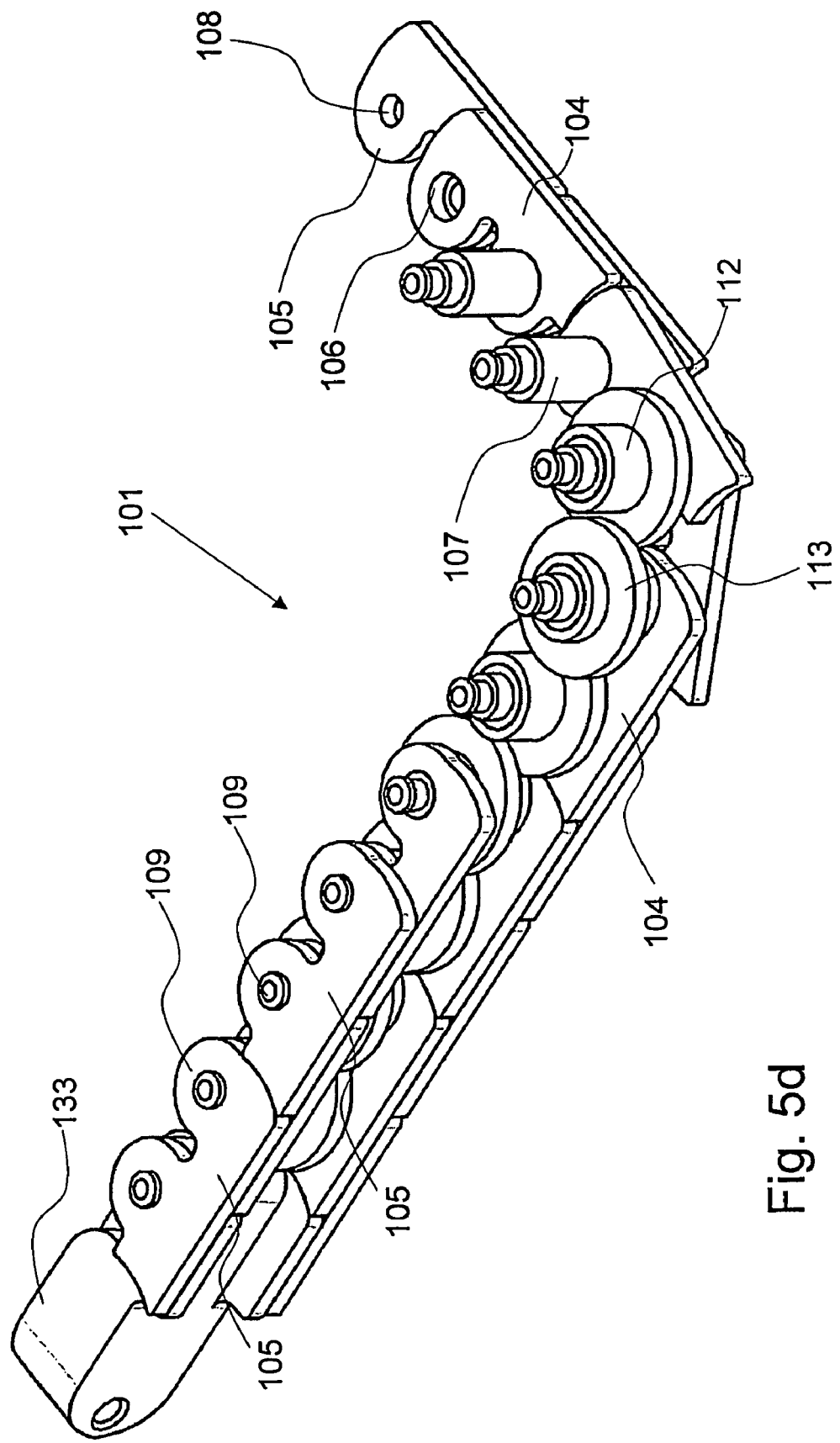

Two rollers are placed on each bushing 7, a small diameter roller 12 and a large diameter roller 13. As shown in FIGS. 2 and 3, the small diameter roller 12 is higher than the large diameter roller 13. The small diameter rollers 12 and large diameter rollers 13 are arranged in a staggered fashion, thus allowing for a large diameter of the large diameter rollers 13 without the large diameter rollers 13 interfering with one another, i.e. to allow an overlap in radial direction of adjacent large diameter rollers 13. Without a staggered arrangement the large diameter rollers could not have a diameter larger than the chain pitch. With a staggered arrangement a large roller diameter of 5/4 of the chain pitch and more can be obtained. Larger rollers roll better and give lower friction losses. Large rollers also facilitate the construction of a chain in which the rollers protrude at least on one side over the height of the chain.

Between the staggered large diameter rollers there is space for receiving a sprocket due to the staggered arrangement and the fact that the small diameter rollers are higher than the large diameter rollers.

The actuator shown in FIG. 4 is composed of a housing 21 and a guide plate 24. The housing 21 may be made as a cast shell profile or be machined from a solid block. The upper side of the actuator for the provision of a substantially closed housing can be closed upwards by a cover plate (not shown). When used as a window or door operator for a window or a door with an openable sash structure, the operator housing will normally be mounted on or in a sash or frame profile which is perpendicular to the opening/closing direction, whereas the free end of the operator member, which is composed of the chain 1 described in detail above, is mounted on the opposite frame or sash profile as known per se from European patent EP-B-1 165 921.

The housing 21 is provided with a chain path 22 extending through a first linear section 23, via an arc-shaped section forming a bend of about 90° to a chain exit 26. On the other end of the linear section 23 the chain path may continue in a conventional manner with further bends, ramps and linear sections to obtain a long chain path in a compact housing that is capable of storing the whole chain 1 in its retracted position. Such chain paths in a compact housing are well known in the art and therefore not described in detail here.

The chain 1 is received in the chain path 23 and the free end of the chain 1 protrudes from the chain exit 26. The free end of the chain 1 can be attached to a bracket 33. The bracket 33 is connected to the object to be actuated, i.e. in case of a window actuator it is pivotally connected to a window sash (not shown). The chain path 22 is throughout its length delimited by a guide surface 28 of the guide plate 24. The guide surface 28 protrudes into the guide path and between the inner and outer links to engage the large diameter rollers 13, and the guide plate thus acts as a rail.

The drive member accommodated in the housing 21 comprises in the embodiment shown a sprocket 29 positioned concentrically with the arc-shaped section. The sprocket 29 is placed on a shaft 30 that is connected via a reduction gearing, such as a straight-, planetary- and/or worm-gear with an electric drive motor (not shown) with reversible rotational direction. The teeth of the sprocket 29 fit between the large diameter rollers 13 and engages the small diameter rollers 12. A rotational movement of the sprocket 29 caused by action of the electric motor causes the chain 1, dependent on the direction of the rotary movement, to move either into or out of the chain path 22.

FIGS. 5a to 5d, 6 and 7 illustrate a chain according to a second preferred embodiment of the invention. The chain 101 is composed of pairs of inner links 104 and outer links 105. The inner and outer links are formed by metal plates that are preferably manufactured in a die stamping process.

The inner links 104 are provided with pairs of holes 106 that receive bushings 107 connecting the pairs of inner links. The outer links 105 are provided with pairs of holes 108 that receive driving pins 109 connecting the pairs of outer links. The driving pins 109 are rotably received inside the bushings and thus hinge the pairs of inner links 105 to the pairs of outer links 105.

The holes 106,108 offset to one side in the height of the links 104, 105 and projections 110 on one longitudinal end of the side away from the pins are complementary with the recesses 110 on the opposite end of the adjacent link. When the chain 1 is straight as shown in FIG. 5 the projections 110 abut with the recesses 111. The links thus have a complementary shape to each other so that, when the chain 101 is under pressure, their longitudinal ends 110, 111 lie directly against each other, to prevent the chain from bending in one direction, which in FIG. 5 would be concave upward.

The contour of the links 104, 105 on the side in which the chain can bend are shaped as an engagement surface for engaging a drive sprocket. This feature does not need to be applied to both the links of a pair, it can also be applied one of the links of each pair, on the condition that the one link is on the same side of the chain of all link pairs.

The engagement surface of each link 104,105 comprises a recess 117 between the holes 106, 108. The recess 117 is suitable for receiving a tooth of a drive sprocket. The engagement surface of each link forms convex protrusions 118 around each of the holes 106, 107 that receive the driving pins/bushings. The protrusions 118 are suitable for being received in the recesses between the teeth of a drive sprocket.

The contour of the projection 110 also forms part of the engagement surface and is shaped to be a part of a recess 118 in the engagement surface between two adjacent links for receiving a tooth of a drive sprocket.

Figure 6:
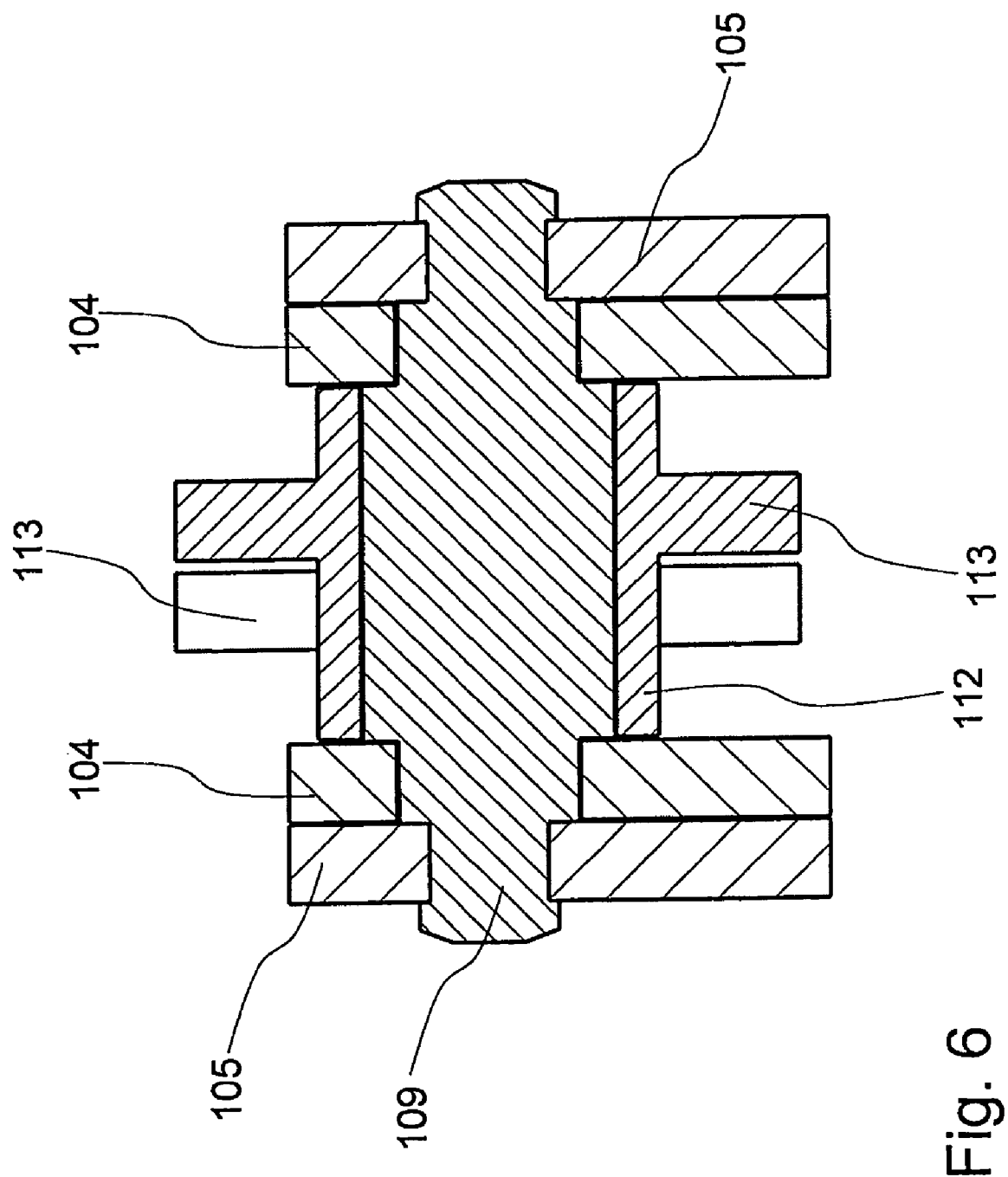
FIG. 6 is a cross-sectional view through the chain of FIG. 5a, FIG. 7 is a top view of the chain of FIG. 5a, FIG. 8 is a perspective cut-away view of an actuator with a chain of FIG. 5a, FIG. 9 is a perspective cut-away view on the chain according to a third embodiment, and FIG. 10. is a perspective cut-away view of an actuator with a chain of FIG. 9.
Figure 7:
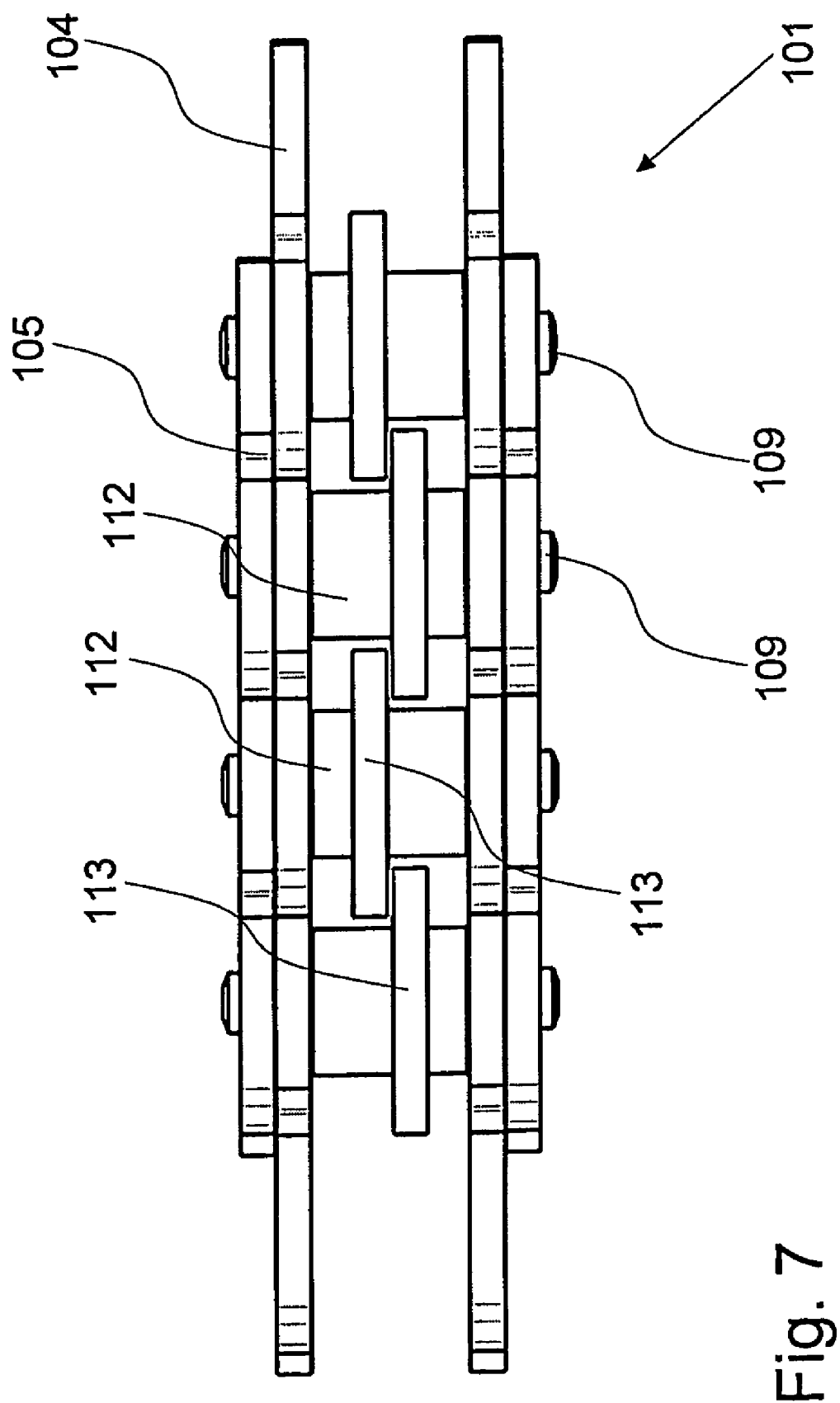

A roller 112 is placed on each bushing 108. The roller 112 is provided with a large diameter section 113. As shown in FIGS. 6 and 7, the large diameter section 113 forms only a small portion of the overall height of the roller 112. The large diameter section 113 is offset relative to the middle of the roller 112. The large diameters sections 113 of the rollers 112 are arranged in a staggered fashion, thus allowing for a large diameter of the large diameter sections 113 without the large diameter sections 113 interfering with one another, i.e. to allow an overlap in radial direction of the large diameter sections of adjacent rollers. Without a staggered arrangement the large diameter sections 113 could not have a diameter larger than the chain pitch. With a staggered arrangement a diameter of up to 5/4 of the chain pitch and more can be obtained. Rollers with a large diameter section roll better and give lower friction losses. Rollers with a large diameter sections also facilitate the construction of a chain in which the rollers protrude at least on one side over the height of the chain.

The large diameter section can be formed by a separate Element (not shown), to allow the overall roller to be formed by ring shaped parts, e.g. die stamped parts.

Figure 8:
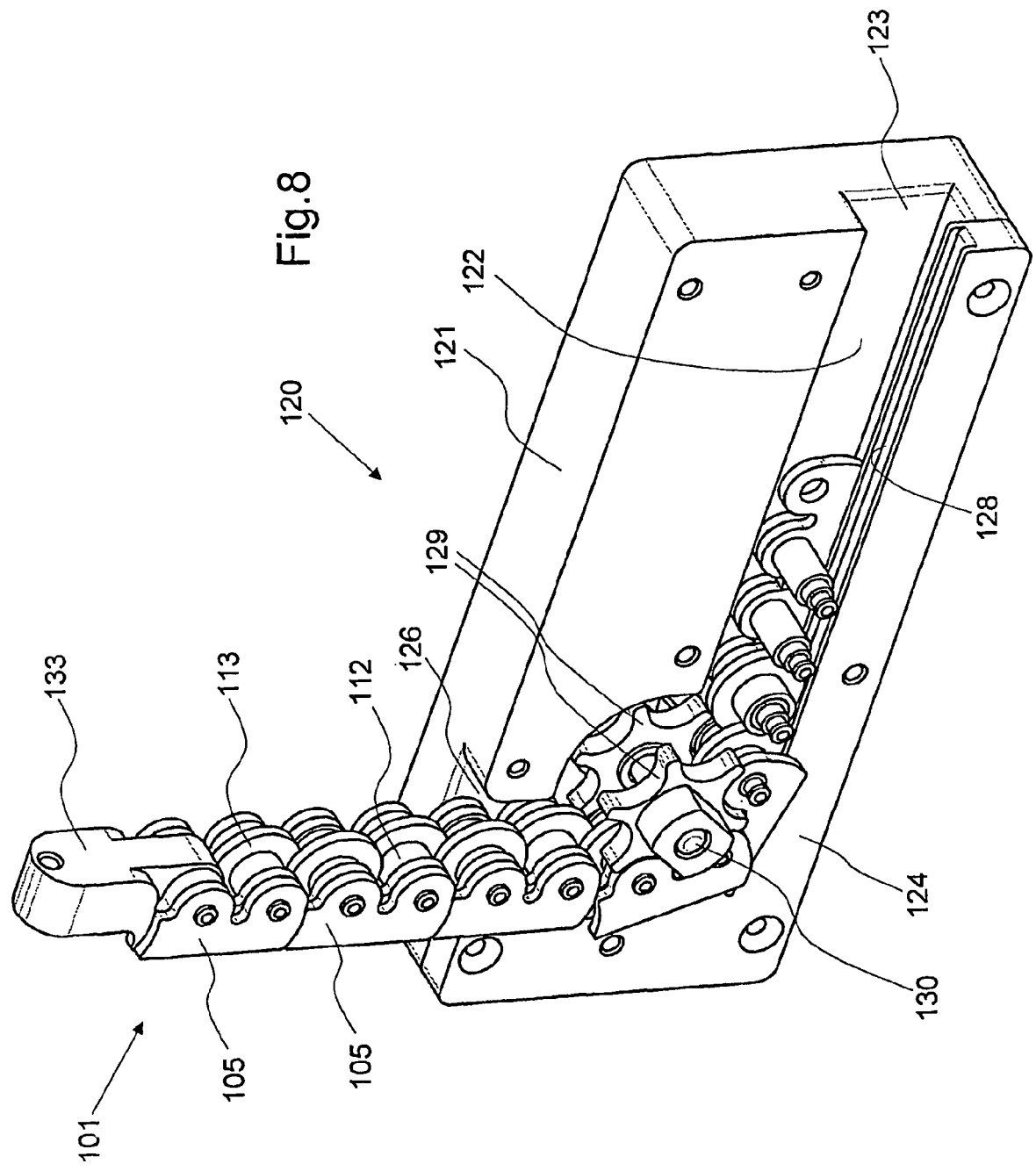

The actuator shown in FIG. 8 is composed of a housing 121 and a guide plate 124. The housing 121 may be made as a cast shell profile or be machined from a solid block. The upper side of the actuator for the provision of a substantially closed housing can be closed upwards by a cover plate (not shown). When used as a window or door operator for a window or a door with an openable sash structure, the operator housing will normally be mounted on or in a sash or frame profile which is perpendicular to the opening/closing direction, whereas the free end of the operator member, which is composed of the chain members described in detail above, is mounted on the opposite frame or sash profile as known per se from European patent EP-B-1 165 921.

The housing 121 is provided with a chain path 122 extending through a first linear section 123, via an arc-shaped section forming a 90° bend to a chain exit 126. On the other end of the linear section 123 the chain path may continue in a conventional manner with further bends, ramps and linear sections to obtain a long chain path in a compact housing that is capable of storing the whole chain 101 in its retracted position. Such chain paths in a compact housing are well known in the art and therefore not described in detail here.

A chain 101 is received in the chain path 123 and the free end of the chain 101 protrudes form the chain exit 126. The free ends of the chain 101 can be attached to a bracket 133. The bracket 133 is connected to the object to be actuated, i.e. in case of a window actuator it is pivotally connected to a window sash (not shown). The chain path 122 is throughout its length delimited by the guide surface 128 of the guide plate 124. The guide surface 128 protrudes into the guide path and between the inner and outer links to engage the large diameter section 113 of the rollers 112 and thus forms a guide rail.

The drive member accommodated in the housing 121 comprises in the embodiment shown a set of two sprockets 129 positioned concentrically with the arc-shaped section.

The sprockets 129 are placed on a shaft 130 that is connected via a reduction gearing, such as a straight-, planetary- and/or worm-gear with an electric drive motor (not shown) with reversible rotational direction. The teeth of the respective sprockets 129 fit into the recesses 117 and 118 formed by the contour of the inner and our links 104, 105 on either side of the chain 101. It is of course also possible to drive the chain with only one sprocket 129, in which case the links need to form a sprocket engagement surface only on one side of the chain (not shown).

A rotational movement of the sprocket 129 caused by action of the electric motor causes the chain 101, dependent on the direction of the rotary movement, to move either into or out of the chain path 122.

Figure 9:
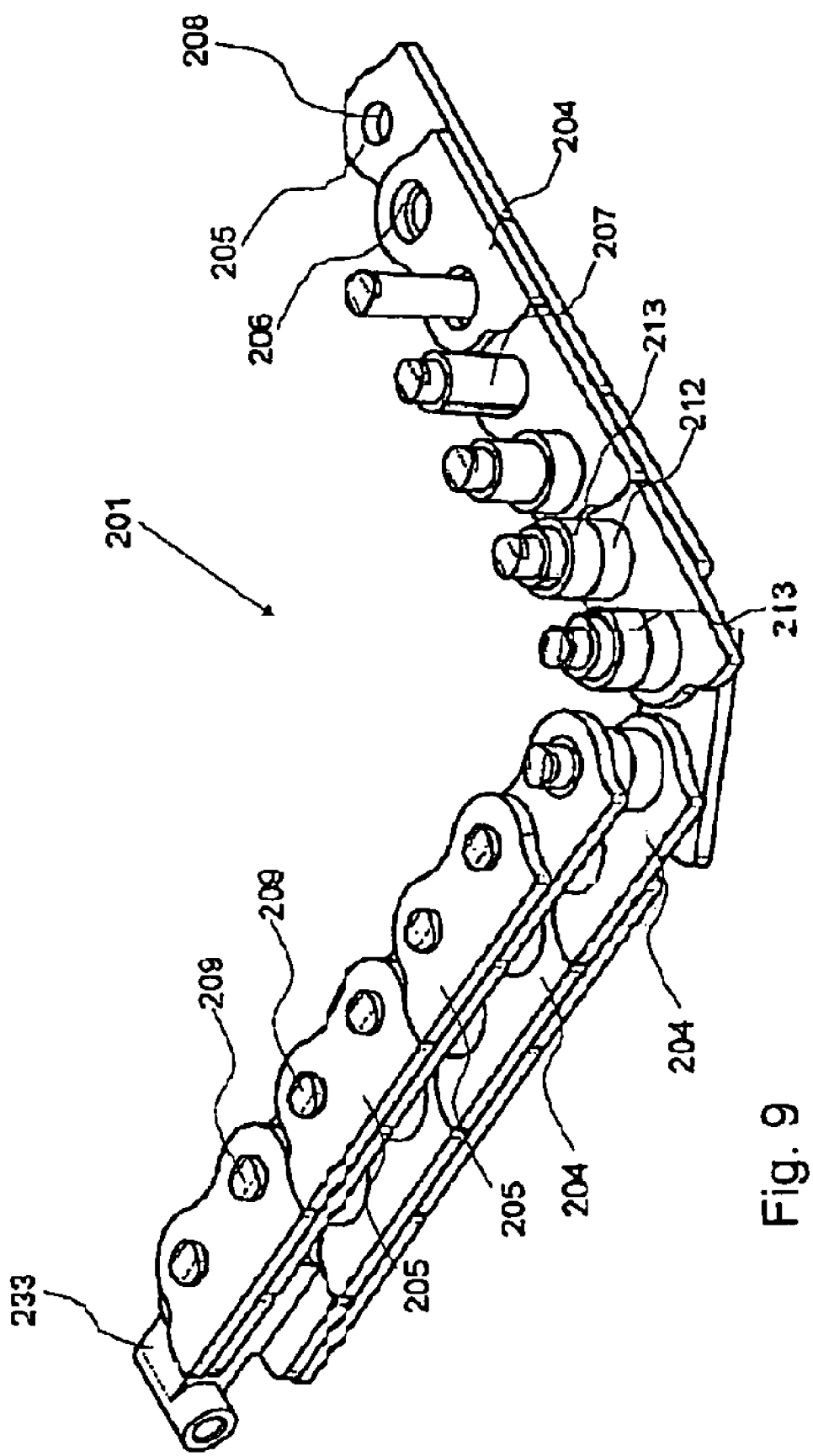
Figure 10:
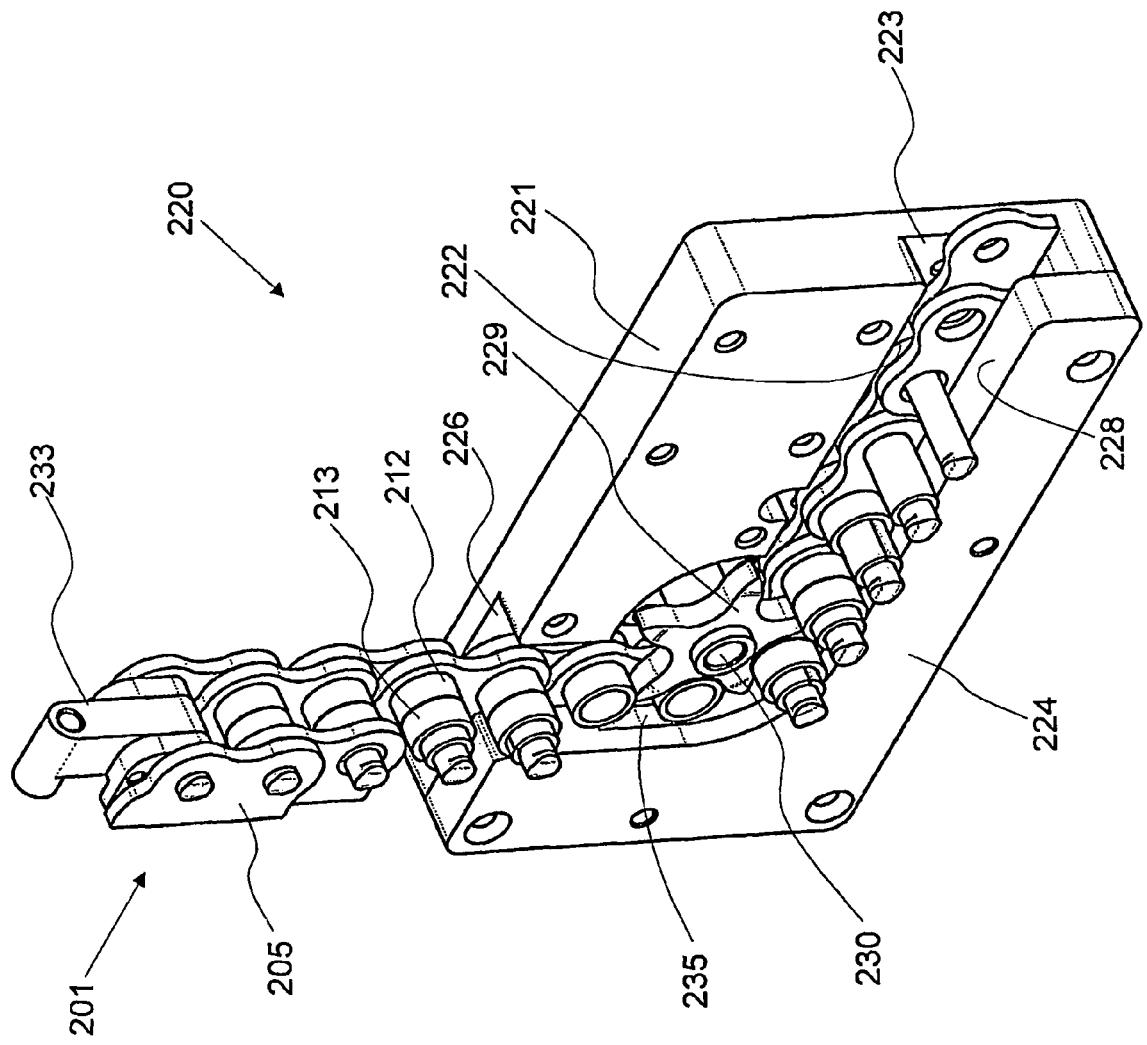

FIGS. 9 and 10 illustrate a chain according to a third preferred embodiment of the invention. The chain 201 is composed of pairs of inner links 204 and outer links 205. The inner and outer links are formed by metal plates that are preferably manufactured in a die stamping process.

The inner links 204 are provided with pairs of holes 206 that receive bushings 207 connecting the pairs of inner links. The outer links 205 are provided with pairs of holes 208 that receive driving pins 209 connecting the pairs of outer links. The driving pins 209 are rotably received inside the bushings and thus hinge the pairs of inner links 205 to the pairs of outer links 205.

The holes 206, 208 offset to one side in the height of the links 204, 205 and projections on one longitudinal end of the side away from the pins are complementary with the recesses on the opposite end of the adjacent link. When the chain 201 is straight the projections abut with the recesses. The links thus have a complementary shape to each other so that, when the chain 201 is under pressure, their longitudinal ends directly against each other, to prevent the chain from bending in one direction, which in FIG. 9. would be upward.

Two rollers 212, 213 are placed on each bushing 208. The two rollers 212 and 213 can rotate independently from one another.

Between the diameter rollers there is space for receiving the teeth of sprocket.

The actuator shown in FIG. 10 is composed of a housing 221 and a guide plate 224. The housing 221 may be made as a cast shell profile or be machined from a solid block. The upper side of the actuator for the provision of a substantially closed housing can be closed upwards by a cover plate (not shown). When used as a window or door operator for a window or a door with an openable sash structure, the operator housing will normally be mounted on or in a sash or frame profile which is perpendicular to the opening/closing direction, whereas the free end of the operator member, which is composed of the chain 1 described in detail above, is mounted on the opposite frame or sash profile as known per se from European patent EP-B-1 165 921.

The housing 221 is provided with a chain path 222 extending through a first linear section 223, via an arc-shaped section forming a 90° bend to a chain exit 226. On the other end of the linear section 223 the chain path may continue in a conventional manner with further bends, ramps and linear sections to obtain a long chain path in a compact housing that is capable of storing the whole chain 201 in its retracted position. Such chain paths in a compact housing are well known in the art and therefore not described in detail here.

The chain 201 is received in the chain path 223 and the free end of the chain 201 protrudes form the chain exit 226. The free end of the chain 201 can be attached to a bracket 233. The bracket 233 is connected to the object to be actuated, i.e. in case of a window actuator it is pivotally connected to a window sash (not shown). The chain path 222 is throughout its length delimited by a guide surface 228 of the guide plate 224. The guide surface 228 protrudes into the guide path and between the inner and outer links to support both rollers 212 and 213—except for the curve section—and the guide plate thus acts as a rail.

The drive member accommodated in the housing 221 includes in the embodiment shown a sprocket 229 positioned concentrically with the arc-shaped chain path section. The sprocket 229 is placed on a shaft 230 that is connected via a reduction gearing, such as a straight-, planetary- and/or worm-gear with an electric drive motor (not shown) with reversible rotational direction. A rotational movement of the sprocket 229 caused by action of the electric motor causes the chain 201, dependent on the direction of the rotary movement, to move either into or out of the chain path 222.

In the arc-shaped section the sprocket engages rollers 212, whereas only the rollers 213 are supported by a narrower section of the guide surface 228. Hereto, the guide surface 228 is narrower in the arc-shaped section thus making place for a recess 235 that that ensures that rollers 212 do not engage a support surface whilst being engaged by the sprocket. The rollers 212 are for at least a part of the distance that they pass through the arc-shaped section engaged by the sprocket, and thus prevented from freely rotating about the bushing 207. The rollers 213 can however rotate independently from the rollers 212 and ensure that the chain 201 is supported all the way through the curved chain path section by freely rotating rollers 213.

The bushings 7, 107 and 207, as well as the rollers, 12, 13, 112, 113, 212 and 213 can be coated or treated to provide improved dry lubrication characteristics. Such coatings may comprise multilayered diamond like carbon material or other coatings that are known to improve dry lubrication characteristics with steel surfaces. The bushings can be made of a sintered oil impregnated and porous material to improve the dry lubrication characteristics of the chain.

The invention can also be carried out with chains that have pins with an increased diameter between the inner links instead of bushings.

Thus, while the preferred embodiments of the devices and methods have been described in reference to the environment in which they were developed, they are merely illustrative of the principles of the invention. Other embodiments and configurations may be devised without departing from the scope of the appended claims.

The invention claimed is:

1. A push-pull chain for use in an actuator provided with a sprocket to drive said chain, said chain comprising:
   a plurality pairs of inner links and outer links, alternate pairs of said inner links being sequentially coupled to alternate pairs of said outer links by parallel driving pins with rollers, the links being shaped to allow the chain to bend in one direction only;
   at least two rollers being placed on each of the driving pins, one of said at least two rollers on a given driving pin engages said sprocket at the same time that the other of said at least two rollers on said given driving pin engages only a guide surface of said actuator; and
   wherein each driving pin is provided with a large diameter roller and with a small diameter roller, the large diameter rollers serving to engage the guide surface, and the small diameter rollers serving to engage the sprocket.

2. A push-pull chain according to claim 1, wherein the large diameter rollers and the small diameter rollers are staggered from driving pin to driving pin.

3. A push-pull chain according to claim 1, wherein the small diameter rollers are higher than the large diameter rollers, preferably about two to four times as high.

4. A push-pull chain according to claim 1, wherein the rollers on a driving pin can rotate independently of one another.

5. A push-pull chain according to claim 1, wherein the longitudinal ends of the inner links and/or outer links have a complementary shape to each other so that, when the chain is under pressure, their longitudinal ends lie directly against each other, to prevent a bending movement of the chain in one direction.

6. A push-pull chain according to claim 5, wherein the holes for the pins are offset to one side in the height of the links and projections on one longitudinal end of the side away from the pins are complementary with the opposite end of the adjacent link.

7. A push-pull chain for use in an actuator provided with a sprocket to drive said chain, said chain comprising:
   a plurality pairs of inner links and outer links, alternate pairs of said inner links being sequentially coupled to alternate pairs of said outer links by parallel driving pins with rollers, the links being shaped to allow the chain to bend in one direction only;
   at least two rollers being placed on each of the driving pins, one of said at least two rollers on a given driving pin engages said sprocket at the same time that the other of said at least two rollers on said given driving pin engages only a guide surface of said actuator; and
   wherein the driving pins connecting the outer links are received in bushings connecting the inner links and the rollers are placed over the bushings.

8. A push-pull chain for use in an actuator provided with a sprocket to drive said chain, said chain comprising:
   a plurality pairs of inner links and outer links, alternate pairs of said inner links being sequentially coupled to alternate pairs of said outer links by parallel driving pins with rollers, the links being shaped to allow the chain to bend in one direction only;
   at least two rollers being placed on each of the driving pins, one of said at least two rollers on a given driving pin engages said sprocket at the same time that the other of said at least two rollers on said given driving pin engages only a guide surface of said actuator; and
   wherein the large diameter rollers protrude on side over the height of the links.

9. A push-pull chain according to claim 1, wherein the links are formed by plates.

10. A push-pull chain for use in an actuator provided with a sprocket to drive said chain, said chain comprising:
    a plurality pairs of inner links and outer links, alternate pairs of said inner links being sequentially coupled to alternate pairs of said outer links by parallel driving pins with rollers, the links being shaped to allow the chain to bend in one direction only;
    at least two rollers being placed on each of the driving pins, one of said at least two rollers on a given driving pin engages said sprocket at the same time that the other of said at least two rollers on said given driving pin engages only a guide surface of said actuator; and
    wherein large diameter rollers on adjacent drive pins overlap one another radially.

11. An actuator for use with a chain, wherein the chain comprises:
    a plurality pairs of inner links and outer links, alternate pairs of said inner links being sequentially coupled to alternate pairs of said outer links by parallel driving pins with rollers,
    the links being shaped to allow the chain to bend in one direction only, and
    at least two rollers being placed on each of the driving pins, one of said at least two rollers on a given driving pin engages said sprocket at the same time that the other of said at least two rollers on said given driving pin engages only a guide surface of said actuator;
    the actuator comprising:
    a sprocket, and
    an actuator housing provided with a chain path in communication with a chain exit opening,
    the chain path including a guide surface,
    the chain being at least partially received in the chain path,
    the sprocket engages only one of the at least two rollers on a given drive in at the same time that
    the guide surface engages only the other of the at least two rollers on said given drive pin.

12. An actuator according to claim 11, wherein the guide surface is formed by a rail.

13. An actuator according to claim 12, wherein the chain path comprises an arc-shaped section guiding the chain along the sprocket with the one of said at least two rollers on a given drive pin engaging the sprocket at the same time that another of said at least two rollers engages the arc-shaped section of the guide surface.

14. An actuator according to claim 13, wherein the guide surface in said arc-shaped section is has a width that is less or equal to the width of the other one of said at least two rollers that engages the guide surface in the arc-shaped section.

15. An actuator according to claim 14, wherein the arc-shaped section of the chain path is provided with a recessed section besides the guide surface, said recessed section providing space to ensure that the one of said at least two rollers does not engage a support surface whilst being engaged by the sprocket.

16. An actuator according to claim 15, wherein the guide surface has a width that is equal or slightly less than the width of the two of said at least two rollers together.

17. A push-pull chain for use in an actuator provided with a sprocket to drive said chain, said chain comprising:
   a plurality of pairs of inner links and outer links, each link having a height, holes to engage driving pins, first and second longitudinal ends and a generally flat first side and a second side with an link contour forming an engagement surface for engaging a sprocket;
   alternate pairs of said inner links being sequentially coupled to alternate pairs of said outer links by parallel drive pins, provided with rollers for engaging a guide surface that guides the chain around the sprocket, the roller has a large diameter section and a small diameter section wherein the large diameter section protrudes over the height of the links; and
   the links being shaped to allow the chain to bend to the second side only.

18. A push-pull chain according to claim 17, wherein the engagement surface forms a recess between the holes in the links that receive the drive pins.

19. A push-pull chain according to claim 17, wherein the engagement surface forms convex protrusions around the holes that receive the drive pins.

20. A push-pull chain according to claim 18, wherein the recess between the holes are suitable for receiving a tooth of a drive sprocket.

21. A push-pull chain according to claim 18, wherein the protrusions are suitable for being received in the recesses between the teeth of a drive sprocket.

22. A push-pull chain according to claim 17, wherein the drive pins connecting the outer links are received in bushings connecting the inner links and the rollers are placed over the bushings.

23. A push-pull chain according to claim 22, wherein the engagement surface forms a recess between the holes in the links that receive the bushings.

24. A push-pull chain according to claim 22, wherein the engagement surface forms convex protrusions around the holes that receive the bushings.

25. A push-pull chain according to claim 23, wherein the recess between the holes is suitable for receiving a tooth of a drive sprocket.

26. A push-pull chain according to claim 24, wherein the protrusions are suitable for being received in the recesses between the teeth of a drive sprocket.

27. A push-pull chain according to claim 17, wherein the large diameter section and the small diameter section are staggered from drive pin to drive pin, so as to allow an overlap in radial direction of the large diameter sections of adjacent rollers.

28. A push-pull chain according to claim 17, wherein the large diameter section and the small diameter section are formed by separate rollers.

29. A push-pull chain according to claim 17, wherein the longitudinal ends, of the inner links and/or outer links have a complementary shape to each other so that, when the chain is under pressure, their longitudinal ends lie directly against each other, to prevent a bending movement of the chain in one direction.

30. A push-pull chain according to claim 29, wherein the holes for the drive pins are offset to one side in the height of the links and a projection on a first longitudinal end of the side away from the drive pins are complementary with the second longitudinal end of the adjacent link.

31. A push-pull chain according to claim 30, wherein a portion of the projection forms part of a recess in the engagement surface between two adjacent links that is suitable for receiving a tooth of a drive sprocket.

32. An actuator with a chain according to claim 17, comprising:
   an actuator housing provided with a chain path in communication with a chain exit opening,
   the chain in its retracted position being at least partially received in the chain path, and a drive sprocket engaging the engagement surface of one or more of the links.

33. An actuator according to claim 32, wherein the guide surface is a preferably grooved rail.

34. An actuator according to claim 33, wherein the chain path comprises an arc-shaped section concentric with the sprocket guiding the chain along the drive sprocket with the links engaging the sprocket.

35. An actuator according to claim 32, in which the chain is provided with large diameter rollers engaging a guide surface of the chain path.

* * * * *